United States Patent Office 3,188,178
Patented June 8, 1965

3,188,178
PROCESS OF PRODUCING SILICON TETRAHALIDE
Kenneth Arkless and Colin Francis Cole, Stockton-on-Tees, England, assignors to British Titan Products Company Limited, Durham, England, a company of Great Britain
No Drawing. Filed Dec. 26, 1961, Ser. No. 162,241
Claims priority, application Great Britain, Jan. 5, 1961, 573/61
6 Claims. (Cl. 23—205)

This invention relates to an improved process for the preparation of silicon tetrahalides by halogenation of ferrosilicon which reacts highly exothermically with a halogenating gas. Fluorination is, however, excluded from the present invention, so that the term "halide," "tetrahalide," "halogen," "halogenating" and "halogenation" must be construed herein to exclude fluoride, tetrafluoride, fluorine, fluorinating and fluorination.

Even if halogenation of ferrosilicon is carried out in a fluidised bed, regions of local overheating may occur. Relatively high temperatures, e.g. 800° C., or even up to 1200° C., will normally be used in the production of silicon tetrahalides; local overheating above such temperatures may lead to fusion or sintering of the bed material, even to the extent of stopping the fluidising operation. Furthermore, the partially fused bed may lead to damage of the material constituting the walls of the reactor.

These particular dangers do not exist when chlorinating such material at the relatively low temperature, e.g. 190°–250° C. required to prepare silicon chloropolysilanes, and the present invention is not concerned with such low temperatures.

Moreover, the occurrence of regions of local overheating means that the temperature of the bed is not uniform and may, on the contrary, vary considerably in different parts of the bed. Lack of uniformity of bed temperature is obviously undesirable from the point of view of control and, moreover, tends to vary the quality of the reaction product to an undesirable extent.

It is an object of this invention to overcome these difficulties and to provide a process for preparing silicon tetrahalides in which both the reaction temperature and the quality of the reaction product can be easily and closely controlled. It is a further object to provide a flexibility of control such that the degree of cooling can be rapidly and efficiently varied at any time. It is a further object to provide substantially uniform temperature in the bed, with substantially uniform distribution of the fluidising gases in the bed.

According to the invention, the process of preparing substantially pure silicon tetrahalide by the reaction in a fluidised bed, at a temperature within the range 400–1200° C., of a halogenating gas and ferrosilicon which reacts directly and highly exothermically with the halogenating gas at such a temperature, comprises the dilution of the halogenating gas with an inert gaseous diluent; the halogenating gas and the inert gaseous diluent being substantially uniformly distributed in the bed by being introduced into the bottom of the bed through a perforated plate such that the pressure drop across each perforation is at least half of the pressure drop across the bed.

The preferred halogenating gas is chlorine.

The inert gaseous diluent dilutes the halogenating gas and reduces the violence of the reaction. This can be readily controlled by varying the proportion of the inert gaseous diluent. The uniform distribution of the gases, achieved by observing the aforesaid pressure drop across each perforation, ensures that such control is uniformly applied throughout the bed.

The preferred method of introducing the inert gaseous diluent is to mix it with the halogenating gas prior to introduction into the bed. Alternatively, or in addition, inert gaseous diluent can be separately introduced. Additionally, solid or liquid additive, which will vapourise to produce supplimentary inert gaseous diluent, may be introduced anywhere in the bed and, to effect part of the cooling of the bed, may even be added to the upper surface of the bed.

The inert gaseous diluent can be any gas which remains unchanged during its passage through the bed. It must naturally have a boiling point below the temperature of the bed, and it preferably has a boiling point between 20° C. and 400° C. Recovery of the diluent from the effluent gases is facilitated when the diluent has a boiling point above 20° C. The diluent should, of course, be relatively cool initially.

The inert gaseous diluent is suitably a metal or metalloid halide, although other gases, such as nitrogen or carbon monoxide may be used. The preferred diluents are the tetrachloride, tetrabromide or tetraiodide of silicon. It is generally of advantage to use a halide containing the same halogen as the halogenating gas, since this introduces no gaseous impurities into the effluent gases. Thus, if the halogenating gas is a chlorinating gas, it is preferable that the inert gaseous diluent be silicon tetrachloride.

The volume of inert gaseous diluent used may be 40–90% of the total volume of diluent plus halogenating gas. The exact volume used may depend on the type and size of the reactor, the throughput of the reactants, and the reaction temperature which is chosen.

Part of the silicon tetrahalide issuing from the bed may be recycled after cooling to dilute fresh amounts of incoming halogenating gas. This makes the process more efficient since, once the process has begun and has reached the stage at which sufficient quantities of silicon tetrahalide are leaving the fluidised bed, the necessary quantity of silicon tetrahalide diluent is generated within the system. In such a case, the silicon tetrahalide diluent may be recycled together with any unreacted halogenating gas.

The inert gaseous diluent may, of course, be recycled even if it is not the silicon tetrahalide product of the reaction. It may be recycled alone, after separation from the other effluent gases, or it may be recycled in admixture with some silicon tetrahalide as extra diluent and/or with any unreacted halogenating gas.

The ferrosilicon will generally contain 30–95% by weight of silicon; the remainder will consist principally of iron. It will be appreciated, however, that ferrosilicon is normally manufactured from relatively crude materials and therefore other impurities may be present. These impurities will largely be metals or metallic compounds. Of these, the ones which form liquid non-volatile compounds are mainly in the alkali and alkaline earth groups, and are especially calcium and, to a much smaller extent, magnesium. Where these materials are present in substantial quantities, it may be necessary, in order to overcome fusion, to limit the upper range of temperature, e.g. it may be necessary to operate the process at temperatures not exceeding 600° C. In such cases the utility of the invention is great, since it allows precise control of the temperature of the bed and so facilitates the use of such impure materials.

The raw material described in this specification is likely to have present impurities which cannot be halogenated or which are not easily halogenated under the temperature conditions selected or preferred. Thus, the bed may under practical and economic conditions tend to accumulate impurities which are not evolved from the bed in gaseous form or in the form of fine dust. For this reason, the proportion of silicon in the bed is likely to decrease and therefore, although the process is normally intended to run continuously, there may be a need for intermittent purging or special treatment of the bed. The preferred method is to purge the bed periodically but there could be other means, such as temporarily increasing the temperature of the bed in order to halogenate or volatilise the impurities present.

The silicon in this process is preferentially halogenated and so iron accumulates within the bed. Whilst this iron can subsequently be halogenated and removed, it may not always be desirable to do this as it might necessitate unnecessary consumption of halogen. Thus, the bed might be purged of not only unhalogenatable materials or materials which are not volatilised as a result of halogenation, but also materials which, although halogenatable, are not desired in a halogenated form.

The following examples illustrate the use of the invention:

Example I

A silica reaction tube 45 inches long and 2 inches in diameter contained a bed of ferrosilicon particles whose diameters were in the range 251–500$\mu$. The bed of ferrosilicon weighed 323 gms. and contained 92% silicon by weight. The static height of the bed was 5 inches. A stream of nitrogen was passed upwardly through the bed at a rate of 3 litres per minute. The temperature of the bed was then raised to 600° C. by external heating.

Liquid silicon tetrachloride was passed at a rate of 35 ml. per minute into a vaporiser, where it was heated to 200° C. and so vaporised. The stream of silicon tetrachloride vapour was passed upwardly through the bed. Immediately, external heating of the bed was stopped, and the stream of nitrogen was replaced by a stream of chlorine at a rate of 3 litres per minute. Ferrosilicon particles were fed to the upper surface of the fluidised bed from a hopper at the rate of 2 gms. per minute, so as to maintain the amount of ferrosilicon in the bed. The effluent gases from the bed were passed to a condenser in which the silicon tetrachloride was condensed. Part of the condensed silicon tetrachloride was returned to the vapouriser.

During the process, the temperature in the fluidised bed rose steadily to 840° C. and, during a 90 minute run, this temperature was maintained within ±40° C. substantially uniformly throughout the bed.

Example II

A static bed 20 inches deep of ferrosilicon particles whose diameters were in the range 152–699$\mu$ was placed in a water cooled steel reactor of internal diameter 10 inches and length 6 feet. The reactor was lined with a 1 inch layer of refractory concrete.

The bed of ferrosilicon, which contained 92% silicon by weight, was fluidised with air distributed through a perforated ceramic base plate and heated by a gas poker to a temperature of 650° C. The gas poker was removed and the air stream was replaced by vaporised silicon tetrachloride, preheated to 100° C. The silicon tetrachloride at a rate of 102 pounds per hour was mixed with chlorine gas fed at a rate of 16.3 pounds per hour.

Under these conditions the bed temperature fell to 510° C. before the silicon tetrachloride and chlorine entered the bed, but the temperature rose steadily after the admission of these gases, and in one hour reached 620° C. It was maintained in the range of 610° C. to 630° C. by slight alterations to the silicon tetrachloride feed rate. The process was carried out for a continuous period of 47 hours during which time hourly additions of ferrosilicon were made of 3.7 pounds per hour. Throughout the run the chlorine utilisation was in excess of 95%, and the effluent gases, which substantially comprised the injected silicon tetrachloride and the silicon tetrachloride produced by chlorination, were led to a cooling system and condensed. After treatment to remove suspended solids part of the recovered silicon tetrachloride was recycled to the reactor.

Example III

A 24 inch deep static bed of ferrosilicon particles with diameters within the range 178–699$\mu$ was placed in an insulated shaft furnace 10 inches in internal diameter and 8 feet long. The bed of ferrosilicon, which contained 92% silicon by weight, was fluidised with air distributed through a perforated refractory base plate and was heated by a gas poker to a temperature of 600° C. The gas poker was then removed and the air stream was replaced by a mixed stream of silicon tetrachloride vapour and chlorine gas preheated to 100° C. The mixed stream of vapour comprised silicon tetrachloride at a flow rate of 90 pounds per hour and chlorine at a flow rate of 24 pounds per hour. In addition liquid silicon tetrachloride was injected into the bed at a rate of 104 pounds per hour via two pipes passing through the side wall of the reactor at points 3 inches and 9 inches above the distribution plate.

Under these conditions the bed temperature settled down to an average value of 530° C. and was maintained in the range 520 to 540° C. during 32 hours of continuous operation. Throughout the run the chlorine utilisation exceded 95%. During this period the bed was fed continuously with further ferrosilicon particles at a rate of 5.5 pounds per hour.

What is claimed is:

1. In the process of producing silicon tetrahalide by reaction of solid ferrosilicon in a fluidized bed at a temperature in the range of from about 400° to about 1200° centigrade with a halogenating gas selected from the group consisting of chlorine, bromine and iodine, the improvements comprising (1) diluting said halogenating gas with at least one diluent gas selected from the group consisting of nitrogen, carbon monoxide, silicon tetrachloride, silicon tetrabromide and silicon tetraiodide, said dilution with said diluent gas being in addition to the silicon tetrahalide produced by the reaction of said halogenating gas with said ferrosilicon, (2) introducing said halogenating gas and said diluent gas into the bottom of the bed through a perforated plate and (3) maintaining the pressure drop across each perforation at least about one-half the pressure drop across the fluidized bed whereby said gases are substantially uniformly distributed in said fluidized bed and a substantially uniform temperature is maintained throughout said bed.

2. Process as defined in claim 1 wherein said gaseous diluent is used in an amount of from about 40 to about 90 percent by volume of the total volume of gases.

3. Process as defined in claim 1 wherein said halogenating gas is chlorine.

4. Process as defined in claim 1 wherein said diluent gas is silicon tetrachloride.

5. Process as defined in claim 1 wherein said halogenating gas is chlorine and said diluent gas is silicon tetrachloride.

6. Process as defined in claim 5 wherein said chlorine and said silicon tetrachloride are pre-mixed prior to introduction into the bed.

References Cited by the Examiner

UNITED STATES PATENTS

| | | | |
|---|---|---|---|
| 2,843,458 | 7/58 | Beattie et al. | 23—205 |
| 2,942,950 | 6/60 | Pallister | 23—205 |
| 2,982,620 | 5/61 | Beattie et al. | 23—205 |

MAURICE A. BRINDISI, *Primary Examiner.*

BENJAMIN HENKIN, *Examiner.*